United States Patent [19]

Hart et al.

[11] Patent Number: 4,870,796
[45] Date of Patent: Oct. 3, 1989

[54] WEATHERPROOF ROOFING MEMBRANE AND METHOD FOR CONSTRUCTING THE SAME

[76] Inventors: Eric R. Hart, Rt. 1 Box 193, Woodburn, Ky. 42101; Ernest M. Hepler, 2726 Central - Apt. 4B, Evanston, Ill. 60201

[21] Appl. No.: 552,361

[22] Filed: Nov. 16, 1983

[51] Int. Cl.⁴ .............................................. E04B 5/00
[52] U.S. Cl. ........................................ 52/409; 52/408; 52/309.8
[58] Field of Search ................. 52/404, 409, 410, 411, 52/309.8, 58.94, 506, 408

[56] References Cited

U.S. PATENT DOCUMENTS

| | | | |
|---|---|---|---|
| 632,825 | 9/1899 | Redick | 52/539 |
| 652,150 | 6/1900 | Terpening | 52/539 |
| 3,029,172 | 4/1962 | Glass | 52/409 X |
| 3,468,086 | 9/1969 | Warner | 52/748 X |
| 3,694,306 | 9/1972 | Fricklas | 52/408 X |
| 3,763,605 | 10/1973 | Freeman | 52/58 |
| 3,958,373 | 5/1976 | Stewart et al. | 52/58 |
| 4,192,116 | 3/1980 | Kelly | 52/518 X |
| 4,272,936 | 6/1981 | Bonaguidi | 52/408 X |
| 4,321,745 | 3/1982 | Ford | 52/410 X |
| 4,351,138 | 9/1982 | McMillan et al. | 52/408 X |
| 4,441,295 | 4/1984 | Kelly | 52/410 X |
| 4,493,175 | 1/1985 | Coppola, Jr. | 52/410 X |

*Primary Examiner*—Carl D. Friedman
*Assistant Examiner*—Creighton Smith
*Attorney, Agent, or Firm*—Juettner, Pyle, Lloyd & Verbeck

[57] ABSTRACT

A weatherproof roofing membrane, and method for constructing the same, comprises a plurality of layers of extensible reinforcing fabric bonded together with an elastomeric polymer, at least the bottom layer, but not the top layer, of the layers of fabric being spot anchored to the roof to form a continuous weatherproof membrane that is durable, light weight, flexible and fire retardant, and has a high degree of solar reflectivity.

16 Claims, 1 Drawing Sheet

WEATHERPROOF ROOFING MEMBRANE AND METHOD FOR CONSTRUCTING THE SAME

BACKGROUND OF THE INVENTION

Many roofing systems use only one layer of fabric embedded in roofing tars and chemical coatings such as butyl rubber, urethanes and acrylics. These fabrics are usually made of cotton, glass or polyester fiber.

Roofing membranes employing cotton fiber fabrics as the reinforcing component suffer from the disadvantage that cotton is subject to decomposition. Although fabrics employing glass fiber are not subject to this defect, they have other disadvantages such that they have no elasticity and hence tend to split when thermal expansion of the roof occurs. Glass fibers exhibit the phenomenon of capillary attraction or "wicking" as it is known in the art, and as a result, take up water which shortens the life of the roofing membrane as an effective waterproof system. Polyester fiber is the best choice for flexibility; but roofs with only one layer suffer from leakage at the seams, and some light can penetrate single coatings sufficiently to cause degradation of the polyester fabric.

The type of waterproofing material is very important to the effective life of the roofing membrane. Roofing membranes employing tars, asphalts, and bituminous pitches are subject to cold weather embrittlement which results in cracking. These coatings do not effectively resist the damaging ultraviolet rays of the sun. Roofing membranes made with some urethane coatings also have short effective lives due to the combined effects of water and solar ultraviolet radiation. Butyl rubber coatings have superior flexibility, but ultraviolet rays eventually cause embrittlement and subsequent splitting. Acrylic formulated polymers have superior weathering properties which retain flexibility and remain waterproof over exceptionally long weathering periods. Test results reveal that acrylic latex polymers exhibit no cracking, embrittlement or significant discoloration after six thousand hours of accelerated aging.

Fully adhered roofing membranes experience the problem of cracking due to thermal expansion and contraction of the roof. That is, at a given point on the roof, the thermal expansion of the roof may exceed the elastic limits of the fully adhered membrane, causing cracking. A spot-anchored membrane is preferable, as it spreads the force due to thermal expansion over a greater area, thus reducing the stress and resultant risk of cracking.

OBJECT OF THE INVENTION

It is an object of this invention to provide a continuous roofing membrane employing two or more layers of reinforcing fabric, bonded together and filled with an elastomeric polymer.

It is also an object of this invention to provide a method of constructing a roofing membrane whereby the same can be applied by common workmen using squeegees and/or rollers, without the use of sophisticated spraying equipment.

Finally, it is the object of this invention to provide a spot anchored roofing membrane.

SUMMARY OF THE INVENTION

The roofing membrane of the invention overcomes many of the disadvantages of prior roofing membranes. The present invention is a spot anchored roofing membrane, which utilizes the superior waterproofing and weathering properties of elastomeric polymers such as acrylic latex in combination with two or more layers of extensible reinforcing fabric, to produce a continuous weatherproof membrane that is durable, lightweight, flexible and fire retardant and has a high degree of solar reflectivity.

The roofing membrane of this invention comprises a plurality of layers of extensible reinforcing fabric overlying and covering the roof, a multiplicity of spaced apart fasteners securing at least the bottom layer, but not the top layer, of said layers of fabric to the roof, each of said layers of fabric being coated with an elastomeric polymer so as to fill the voids of each of said layers of fabric and to bond each of said layers of fabric together, but not to the roof, for providing a spot anchored, flexible, weatherproof membrane.

The purpose of the spot anchored method versus the normally fully adhered method, is to allow elongation of the membrane over a larger area which will eliminate stress cracking normally experienced with fully adhered roof systems.

The roofing membrane can be applied at temperatures above 40° F. when there is no threat of rain during construction. The roofing membrane can be applied over existing roofs that are dry and smooth, flat or sloped.

DETAILED DESCRIPTION

Figure 1:
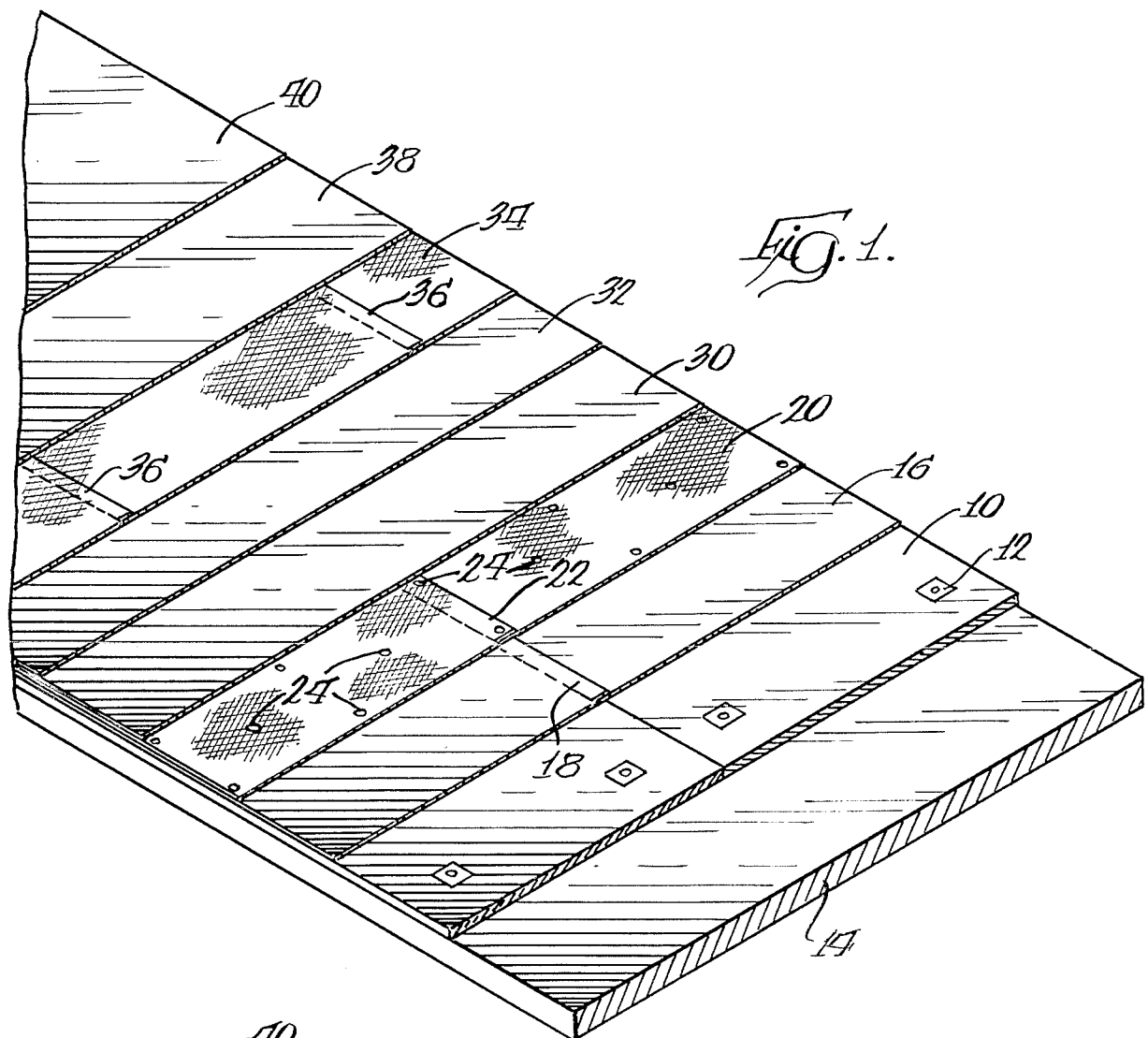
FIG. 1 is a perspective view of the roofing membrane of the invention, illustrating the step-by-step method of construction the same.
Figure 2:
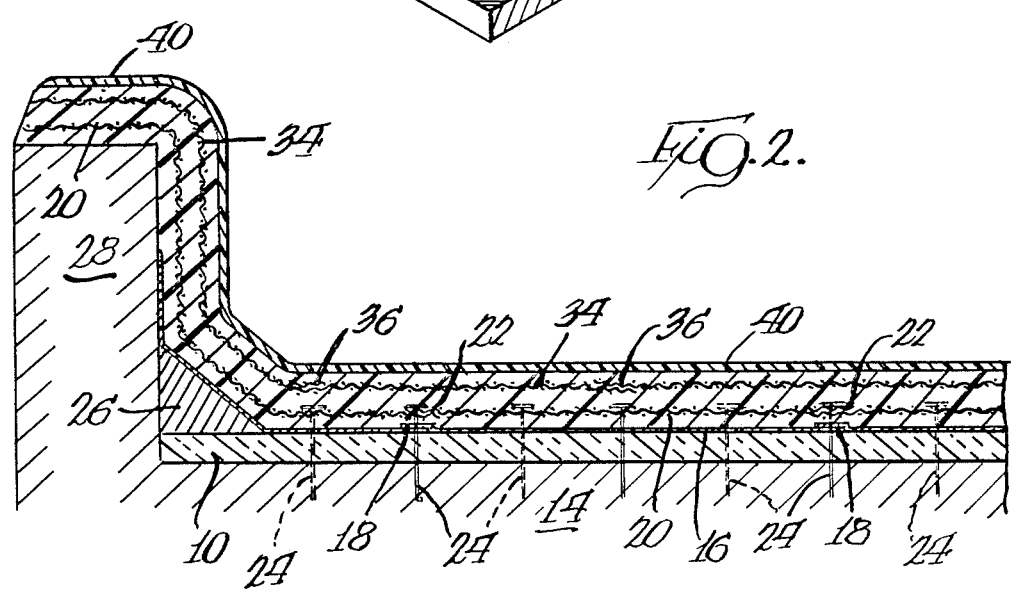
FIG. 2 is an exaggerated cross section through a flat roof having parapets, illustrating the preferred embodiment of the invention.

Referring to FIGS. 1 and 2, the preferred embodiment of this invention is constructed in the following stepwise procedure:

1. If the roof is not insulated and insulation is desirable, a layer of insulation 10 may be applied to the roof 14. Polystyrene plastic insulation 10, anchored to the roof with roofing nails having large washers 12, has been found to be satisfactory.

2. A layer of roofing felt 16 is laid on the roof 14 (or insulation 10), to be used as a slip sheet. In the preferred embodiment, 15 pounds per 100 square feet roofing felt, 36 inches wide is laid out, with 2 to 3 inches overlap 18 between adjacent sheets.

3. The laps 18 in the roofing felt are adheredsealed with elastomeric polymer, to form a continuous layer of roofing felt covering the roof.

4. A first layer of extensible reinforcing fabric 20 is laid over the roofing felt 16. Polyester fabric, 36 inches wide, weighing from 1 to 6 pounds per 100 square feet has been found to be desirable. However, cotton fiber or fiber glass fabrics could also be used. As with the roofing felt, each sheet of fabric overlaps adjacent sheets by 2 to 3 inches, as indicated at 22. Each sheet of fabric is positioned so that the fabric laps 22 are directly over the felt laps 18.

5. The overlaps 22 of the fabric 20 are securely sealed and adhered with elastomeric polymer. This is done by coating the leading edge of the bottom sheet under the overlap with elastomeric polymer.

6. While the elastomeric polymer applied to the fabric laps 22 is still wet, the laps are anchored to the roof with fasteners 24. The fasteners 24 may be any common mechanical anchor, such as nails, or may be a spot of adhesive or spot hot melt of elastomeric polymer. Large headed aluminum nails having neoprene gaskets have been found to work well. The fasteners 24 are arranged in rows, with the fasteners being spaced at approximately 9 inch intervals in each row. One row of fasteners 24 is installed along each lap 22 in the fabric 20. Additional rows of fasteners 24 are also installed at the midpoint and quarterpoints of the fabric 20 with approximately 9 inch spacing between rows. The fasteners 24 in each row are staggered in relationship to the fasteners 24 in the adjacent rows, so as to provide a triangular hold-down pattern, as illustrated in FIG. 1.

7. Immediately after the fasteners are installed, the top of the laps 22 in the fabric 20 are coated with elastomeric polymer which is worked into the fabric to completely seal the laps 22.

8. A starve coat 30 of elastomeric polymer is applied to the first fabric layer 20 in sufficient quantity to starve-fill the voids in the fabric, in order to increase the tear resistance of the fabric. The polymer is worked into the fabric 20 with the aid of squeegees and rollers to remove all residual air bubbles. The starve coating 30 is then allowed to thoroughly dry for 4 to 24 hours, depending on drying conditions.

The elastomeric polymer may be any of the many commonly known elastomeric polymers, such as acrylic latex, asphaltic latex, coal tar latex, rubber modified latex and acrylic resins. Latex emulsions and dispersions have been found to work particularly well, especially acrylic latex, asphaltic latex and coal tar latex polymers. For ease of application, liquid polymers, water or solvent based, are most desirable. However, normally solid or plastic polymers applied in "hot melt" liquid form may also be used.

9. The first layer of fabric 20 is then recoated with a first full coat 32 of elastomeric polymer at a rate in the order of about 1 gallon per 100 square feet.

10. While the first full coat 32 is still wet, a second fabric sheet 34 is laid over the wet polymer 32 in a position that centers each sheet of the second layer of fabric 34 over the laps 22 of the first layer of fabric 20, so that the laps 36 of the second fabric layer 34 are staggered in relation to the laps 22 in the first fabric layer 20. This second layer of fabric 34 is then rolled and pushed into the polymer 32 to provide complete anchorage and bonding to the first layer of fabric 20. The first full coat 32 of polymer is then allowed to dry for 4 to 8 hours, depending on drying conditions.

11. A second full coat 38 of elastomeric polymer is applied over the second layer of fabric 34 at a rate which will completely fill the voids in the second layer of fabric. This coating is then allowed to thoroughly dry.

12. A final finish coat 40 of elastomeric polymer is then applied to leave a smooth, continuous and weatherproof coating.

The membrane, constructed by the foregoing steps, is preferably extended to the cant strip 26 of the roof, up the parapet wall 28 and over the top of the parapet 28 to completely cup the parapet, as shown in FIG. 2. In the preferred embodiment, the roofing felt 16 is extended partially up the parapet wall, thereby covering only the lower portion of the parapet 28. Thus, the coats of elastomeric polymer 30 and 32 will bond, continuously adhere and seal the membrane to the upper portion of the parapet 28, thereby protecting the parapet 28 and preventing seepage of water under the membrane.

The foregoing procedure for sealing the parapet can also be used for sealing around roof penetrations and projections, regardless of shape, thus eliminating the need for sheet metal flashing. Essentially, the roofing membrane of this invention will conform to any roof shape, flat or sloping, in such a manner to produce a continuous weatherproof membrane.

In the preferred step by step of construction above described, two layers of reinforcing fabric are utilized. However, it is to be understood that additional fabric layers may be utilized if desired, provided that at least the bottom layer, but not the top layer, is spot anchored to the roof.

In the foregoing steps 8, 9, 11 and 12, four coats of elastomeric polymer are applied, namely a starve coat, a first full coat, a second full coat and a finish coat. The starve coat is desirable, but not strictly required, as its function is to increase the tensile strength of the first fabric layer. Likewise, the finish coat is not strictly necessary as its primary function is to provide a smooth finish to the membrane. The waterproofing and bonding functions of the two full coats could be accomplished with one heavy coat. However, it has been found desirable to apply several thin coats as disclosed to reduce the required drying time, prevent cracking that can occur with a heavy coat and to insure total film curing.

Finally, while the preferred embodiments of the roofing membrane and the method of constructing the same have been illustrated and described herein, it is to be appreciated that changes, modifications and variations may be made therein without departing from the scope of the invention as defined by the appended claims.

What is claimed is:

1. A membrane for weatherproofing a roof, comprising:
   a plurality of layers of extensible reinforcing fabric overlying and covering the roof;
   a multiplicity of spaced apart fasteners securing at least the bottom layer, but not the top layer, of said layers of fabric to the roof;
   each of said layers of fabric being coated with an elastomeric polymer so as to fill the voids of each of said layers of fabric and to bond each of said layers of fabric together, but not to the roof, for providing a spot anchored, flexible, weatherproof membrane.

2. A membrane as in claim 1, wherein said elastomeric polymer comprises acrylic latex.

3. A membrane as in claim 1, wherein said elastomeric polymer comprises asphaltic latex.

4. A membrane as in claim 1, wherein said elastomeric polymer comprises coal tar latex.

5. A membrane as in claim 1, further comprising:
   a slip sheet overlying the roof and underlying said bonded layers of fabric.

6. A membrane as in claim 1, further comprising:
   a layer of insulation overlying and anchored to the roof, and underlying said bonded layers of fabric.

7. A membrane as in claim 1, further comprising a finish coat of elastomeric polymer bonded to the upper surface of said bonded layers of fabric.

8. A membrane as in claim 1, wherein said fasteners comprise roofing nails having neoprene gaskets.

9. A member for weatherproofing a roof having parapets, comprising:
   a slip sheet overlying and covering the roof and lower portion of the parapets;

a plurality of layers of extensible reinforcing fabric overlying and covering said slip sheet and the upper portion of the parapets;

a multiplicity of spaced apart fasteners securing at least the bottom layer, but not the top layer, of said layers of fabric to the roof;

each of said layers of fabric being coated with an elastomeric polymer so as to fill the voids of each of said layers of fabric and to bond each of said layers of fabric together, and to bond said layers of fabric to the upper portion of the parapets, but not to the roof, for providing a spot anchored, flexible, weatherproof membrane that is continuously sealed to the upper portion of the parapets.

10. A membrane for weatherproofing a roof, comprising:

a plurality of adjacent slip sheets overlying and covering the roof, each of said slip sheets overlapping adjacent sheets, each lap being sealed with elastomeric polymer, to form a continuous slip sheet layer covering the roof;

a plurality of adjacent first sheets of extensible reinforcing fabric overlying and covering said, slip sheet layer each of said first sheets of fabric overlapping adjacent sheets, each lap of fabric being sealed with elastomeric polymer, each lap of fabric directly overlying each slip sheet lap, to form a continuous first layer of fabric covering the roof;

a plurality of rows spaced apart fasteners, said fasteners securing said first layer of fabric and said slip sheet layer to the roof, said rows of fasteners including one row along each lap of said first layer of fabric and at least one row between said laps, each row of fasteners being staggered in relation to adjacent rows so as to provide a triangular hold-down pattern;

a first coat of elastomeric polymer applied to and completely filling the voids in said first layer of fabric;

a plurality of adjacent second sheets of extensible reinforcing fabric overlying and covering said first coated layer of fabric, each sheet of said second sheets of fabric overlapping adjacent sheets to form a continuous second layer of fabric covering the roof, each of the laps in said second layer of fabric being staggered in relation to the laps in said first layer of fabric; and a second coat of elastomeric polymer applied to and completely filling the voids in said second layer of fabric, said first and second coats of elastomeric polymer bonding said first and second layers of fabric together to form a continuous weatherproof membrane.

11. A membrane as in claim 10, including a starve coat of elastomeric polymer on said first layer of fabric beneath said first coat of polymer.

12. A membrane as in claim 10, including a finish coat of elastomeric polymer bonded to the upper surface of said coated second layer of fabric.

13. A method of constructing a weatherproof membrane for a roof, comprising:

laying out a plurality of adjacent slip sheets to overlie and cover the roof;

overlapping adjacent slip sheets;

sealing each lap of said slip sheets with an elastomeric polymer to form a continuous slip sheet layer covering the roof;

laying out a plurality of first sheets of extensible reinforcing fabric to overlie and cover said slip sheet layer;

overlapping adjacent sheets of said first sheets of fabric;

sealing with lap of said first sheets of fabric with an elastomeric polymer to form a continuous first layer of fabric covering the roof;

inserting a plurality of fasteners through said first sheets of fabric and said slip sheets into the roof;

coating said first layer of fabric with a first coat of elastomeric polymer so as to completely fill the voids in said first layer of fabric;

laying out a plurality of second sheets of extensible reinforcing fabric to overlie and cover said first coat of polymer;

overlapping adjacent sheets of said second sheets of fabric to form a continuous second layer of fabric over the roof; and coating said second layer of fabric with a second coat of elastomeric polymer to completely fill the voids in said second layer of fabric and to bond said first and second layers of fabric together.

14. A method of constructing a weatherproof membrane for a roof, comprising:

laying out a plurality of adjacent slip sheets to overlie and cover the roof;

overlapping adjacent slip sheets;

sealing each lap of said slip sheets with an elastomeric polymer to form a continuous slip sheet layer covering the roof;

laying out a plurality of first sheets of extensible reinforcing fabric to overlie and cover said slip sheets layer.

overlapping adjacent sheets of said first sheets of fabric so that each lap of fabric directly overlies one of said laps of said slip sheets;

sealing each lap of said first sheets of fabric with an elastomeric polymer to form a continuous first layer of fabric covering the roof;

inserting a plurality of rows of spaced apart fasteners through said first sheets of fabric and said slip sheets into the roof, one row of fasteners extending along each lap of said first sheets of fabric and at least one row extending between the lap rows, with the fasteners in each row staggered in relation to adjacent rows;

starve coating said first layer of fabric with an elastomeric polymer so as to starve-fill the voids in said first layer of fabric, whereafter said starve coating is allowed to dry;

recoating said first layer of fabric with a first full coat of elastomeric polymer, so as to completely fill the voids in said first layer of fabric;

laying out of plurality of second sheets of extensible reinforcing fabric to overlie and cover said first full coat of elastomeric polymer, while said first full coat is still wet;

overlapping adjacent sheets of said second sheets of fabric, each of centered over the laps of said first sheets of fabric so the laps in said second sheets of fabric being staggered in relation to the laps in said first sheets of fabric;

pushing said second sheets of fabric into the wet first full coat of elastomeric polymer to form a continuous second layer of fabric covering the roof, whereafter said first full coat of elastomeric polymer is allowed to dry;

coating said second layer of fabric with a second full coat of elastomeric polymer so as to completely fill the voids in said second layer of fabric, whereafter said second full coat of elastomeric polymer is allowed to dry; and recoating said second layer of fabric with a fabric coat of elastomeric polymer.

15. A method as in claim 14, including the preliminary step of fastening a layer of insulation to the roof.

16. A method as in claim 14, including the step of applying said first full coat of elastomeric polymer at a rate in the order of about 1 gallons per 100 square feet.

* * * * *